US008908166B2

United States Patent
Matsumoto et al.

(10) Patent No.: US 8,908,166 B2
(45) Date of Patent: Dec. 9, 2014

(54) METHODS AND APPARATUS FOR DOWNHOLE FLUID ANALYSIS

(71) Applicant: Schlumberger Technology Corporation, Sugar Land, TX (US)

(72) Inventors: Hisatoshi Matsumoto, Machida (JP); Hua Chen, Yokohama (JP); Akira Kamiya, Sagamihara (JP); Stephane Vannuffelen, Meudon (FR)

(73) Assignee: Schlumber Technology Corporation, Sugar Land, TX (US)

( * ) Notice: Subject to any disclaimer, the term of this patent is extended or adjusted under 35 U.S.C. 154(b) by 8 days.

(21) Appl. No.: 13/721,034

(22) Filed: Dec. 20, 2012

(65) Prior Publication Data

US 2014/0176946 A1    Jun. 26, 2014

(51) Int. Cl.
*G01N 21/00* (2006.01)
*G01V 8/02* (2006.01)

(52) U.S. Cl.
CPC .................................. *G01V 8/02* (2013.01)
USPC ............................................. 356/73; 356/440

(58) Field of Classification Search
CPC ........... G01N 21/05; G01N 2021/0346; B29D 11/00365; G01J 3/02; G01J 3/0256
USPC .................................................. 436/164, 165
See application file for complete search history.

(56) References Cited

U.S. PATENT DOCUMENTS

| | | | |
|---|---|---|---|
| 7,114,562 B2 | 10/2006 | Fisseler et al. | |
| 7,336,356 B2 | 2/2008 | Vannuffelen | |
| 7,379,180 B2 | 5/2008 | Vannuffelen et al. | |
| 7,609,380 B2 | 10/2009 | Vannuffelen et al. | |
| 7,720,323 B2 | 5/2010 | Yamate et al. | |
| 2004/0104355 A1* | 6/2004 | DiFoggio et al. | 250/461.1 |
| 2007/0171413 A1* | 7/2007 | Vannuffelen et al. | 356/328 |

* cited by examiner

*Primary Examiner* — Tri T Ton
(74) *Attorney, Agent, or Firm* — Daryl R. Wright; Brigitte Echols

(57) ABSTRACT

Methods and apparatus for downhole fluid analysis are disclosed. An example method includes obtaining first measurements from a first spectrometer and a second spectrometer when a light source is on, obtaining second measurements from the first spectrometer and the second spectrometer when the light source is off and calibrating the first spectrometer based on the first measurements and the second measurements.

16 Claims, 6 Drawing Sheets

METHODS AND APPARATUS FOR DOWNHOLE FLUID ANALYSIS

BACKGROUND

Downhole fluids may be analyzed to characterize the fluid using a spectrometer. To enable proper analysis of the fluid, the spectrometer may be calibrated.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

An example method in accordance with the teachings of this disclosure includes obtaining first measurements from a first spectrometer and a second spectrometer when a light source is on, obtaining second measurements from the first spectrometer and the second spectrometer when the light source is off and calibrating the first spectrometer based on the first measurements and the second measurements.

An example method in accordance with the teachings of this disclosure includes obtaining a first measurement of a fluid sample downhole using a first spectrometer and applying a temperature coefficient to the first measurement to compensate for drift in the first measurement. The temperature coefficient is determined based on second measurements obtained when a light source is in a first state and when the light source is in a second state.

An example apparatus in accordance with the teachings of this disclosure includes a first fluid analysis apparatus, a second fluid analysis apparatus, a light source and a processor to determine a temperature coefficient value based on measurements received from the first and second fluid analysis apparatus. The measurements received when the light source is on and when the light source is off.

BRIEF DESCRIPTION OF THE DRAWINGS

Embodiments of systems and methods for downhole fluid analysis are described with reference to the following figures. The same numbers are used throughout the figures to reference like features and components.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

The examples disclosed herein relate to fluid analysis apparatus and methods of calibrating the same. The fluid analysis apparatus may be used to determine the composition of a downhole fluid. In some examples, a downhole fluid sample is analyzed by passing light through the fluid, detecting a spectrum of transmitted and/or backscattered light using one or more spectrometers and processing the measurements obtained to characterize the fluid sample. The processing may include comparing the spectrometer measurements obtained to values in a database and/or reference measurements.

In some examples, a reference spectrometer and a measurement spectrometer are used in connection with the examples disclosed herein. The reference spectrometer measures light directly from the light source and the measurement spectrometer measures light transmitted through the fluid sample. The reference spectrometer may be used for calibration purposes and the measurement spectrometer may be used to determine the composition of the fluid sample. In some such examples, to calibrate the spectrometers and/or their measurements, the two spectrometers may obtain measurements when the light source is on and when the light source is off. Because downhole environments are relatively harsh (e.g., high temperatures and pressures), error may be introduced into downhole measurements (e.g., baseline drift) that prevents the fluid sample from being accurately characterized. To correct for this error, in some examples, the measurements obtained by the reference spectrometer may be used to calibrate the measurements obtained from the measurement spectrometer in real-time and/or a temperature coefficient may be determined and applied to the measurements obtained from the measurement spectrometer in real-time. The temperature coefficient may be determined using optical and/or temperature values taken at the reference and/or the measurement spectrometers.

Figure 1:
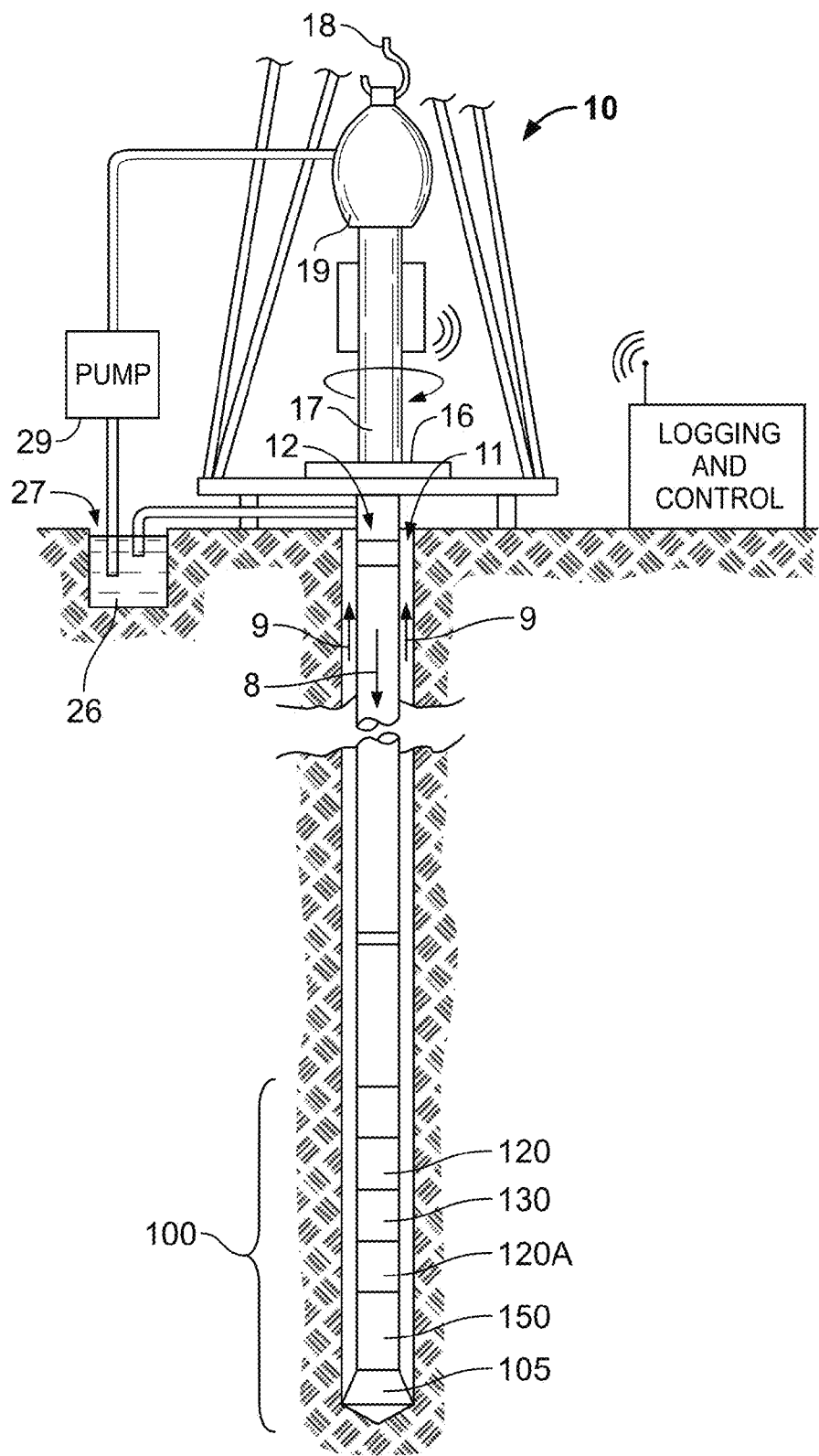
FIG. 1 illustrates an example system in which embodiments of the methods and apparatus for downhole fluid analysis may be implemented.

FIG. 1 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotatory table 16 may be energized by a device or system not shown. The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18. Additionally or alternatively, a top drive system may be used to impart rotation to the drill string 12.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 1 includes a logging-while-drilling (LWD) module 120, a measuring-while-drilling (MWD) module 130, a roto-steerable system and motor 150, and the drill bit 105.

The LWD module 120 may be housed in a special type of drill collar and can contain one or more logging tools. In some examples, the bottom hole assembly 100 may include additional LWD and/or MWD modules. As such, references throughout this description to reference numeral 120 may additionally or alternatively include 120A. The LWD module 120 may include capabilities for measuring, processing, and storing information, as well as for communicating with the surface equipment. Additionally or alternatively, the LWD module 120 includes a sonic measuring device.

The MWD module 130 may also be housed in a drill collar and can contain one or more devices for measuring characteristics of the drill string 12 and/or drill bit 105. The MWD module 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 1 are shown and described as being implemented in a particular conveyance type, the examples disclosed herein are not limited to a particular conveyance type but, instead, may be implemented in connection with different conveyance types including, for example, coiled tubing, wireline wired drillpipe and/or any other conveyance types known in the industry.

Figure 2:
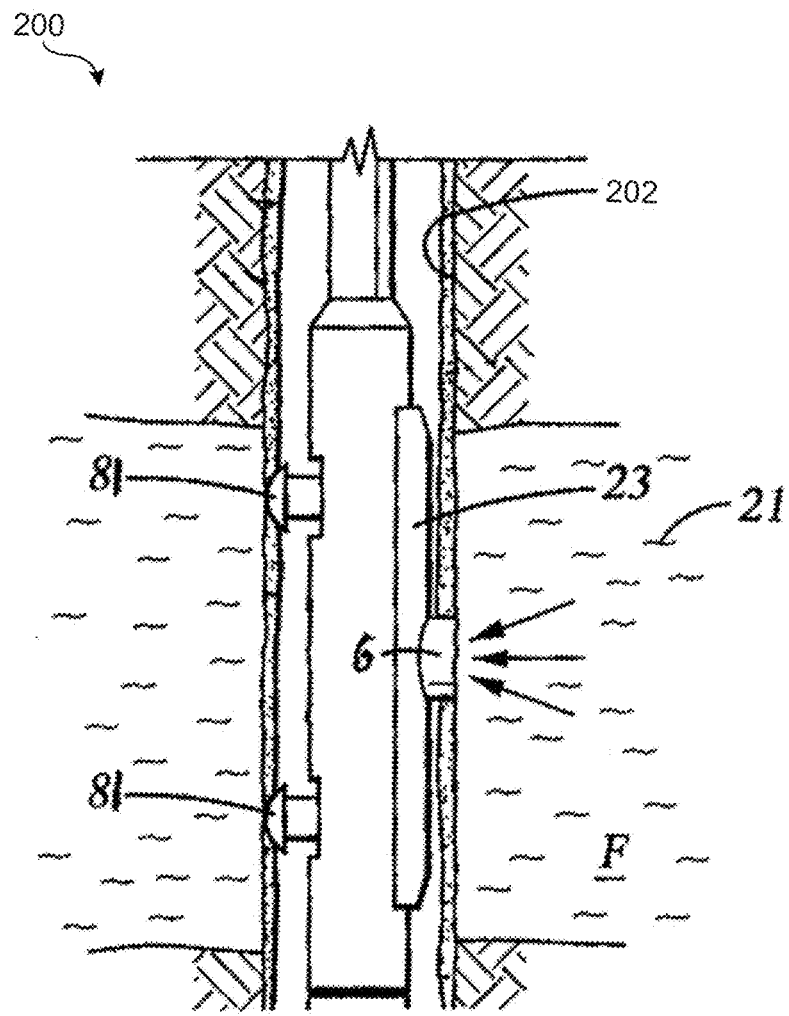
FIG. 2 illustrates another example system in which embodiments of the methods and apparatus for downhole fluid analysis may be implemented.

FIG. 2 is a simplified diagram of a sampling-while-drilling logging device and/or apparatus 200 of a type described in U.S. Pat. No. 7,114,562, incorporated herein by reference, that can be used to implement the LWD tools 120 or 120A. The example apparatus of FIG. 2 is provided with a probe 6 for establishing fluid communication with the formation and drawing the fluid 21 into the tool, as indicated by the arrows. The probe 6 may be positioned, for example, in a stabilizer blade 23 of the apparatus 200 and extend therefrom to engage a borehole wall 202. The stabilizer blade 23 comprises one or more blades that are in contact with the borehole wall 202.

The fluid drawn into the apparatus 200 using the probe 26 may be measured to determine, for example, pretest and/or pressure parameters. Additionally, the apparatus 200 may be provided with devices, such as sample chambers, for collecting fluid samples for retrieval at the surface. Backup pistons 81 may also be provided to assist in applying force to push the drilling tool and/or probe against the borehole wall 202.

Figure 3:
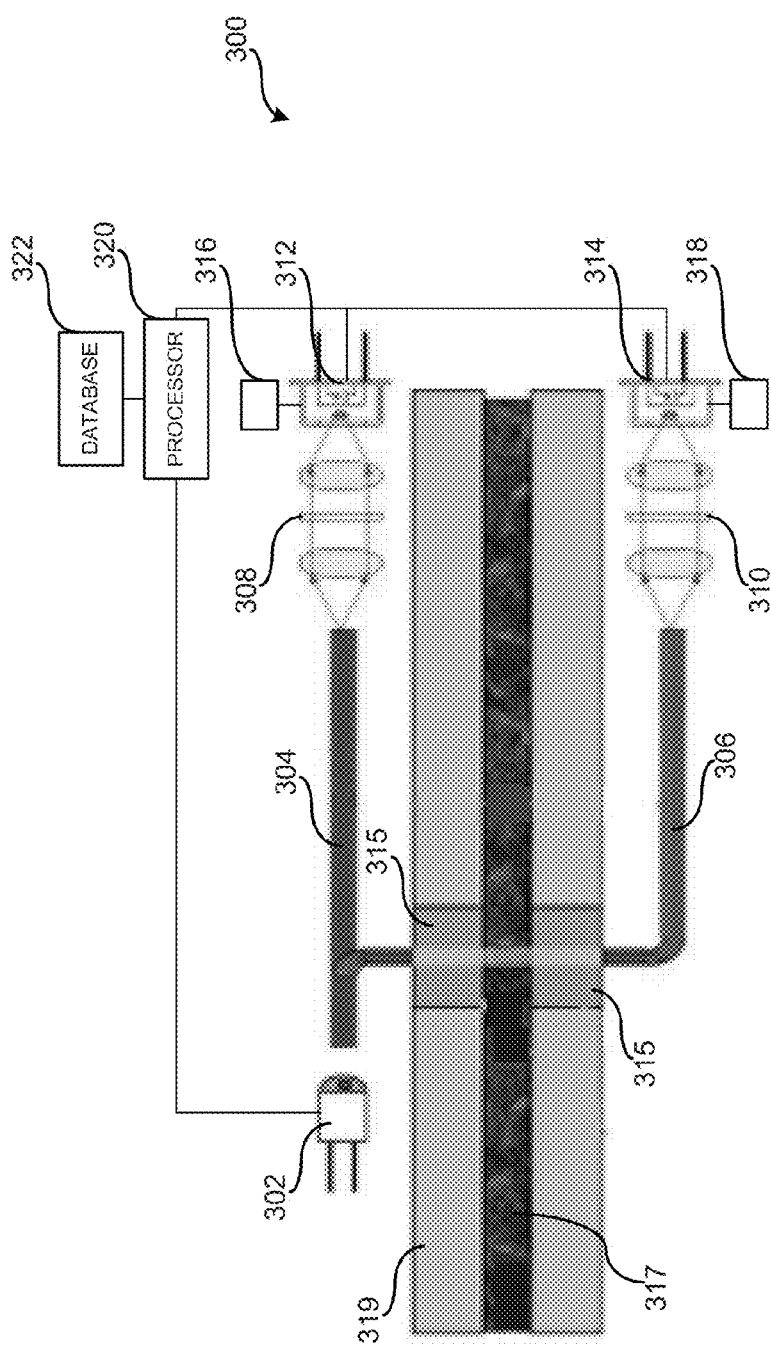
FIG. 3 illustrates an example apparatus in which embodiments of the methods and apparatus for downhole fluid analysis may be implemented.

FIG. 3 depicts an example apparatus 300 that can be used for contamination and/or composition analysis of formation fluids in a downhole environment. The apparatus 300 includes a light source 302, a reference signal path 304, a sample and/or measurement signal path 306, band pass filters 308, 310, first and second detectors and/or spectrometers 312, 314 and first and second temperature sensors 316, 318. The signal paths 304, 306 may include optical fibers. The band pass filters 308, 310 may filter the light from the light source 302 such that light received by the spectrometers 312, 314 is within a particular frequency band. The light source 302 may be a halogen lamp, a light emitting diode (LED), a laser, etc. In some examples, values from the temperature sensors 316, 318 are used to calibrate the spectrometers 312, 314.

The examples disclosed herein may use an on/off light sequence to calibrate the spectrometers 312, 314. By turning the light source 302 on/off, a dark signal may be provided to the respective spectrometer 312, 314 for calibration purposes. Additionally, each spectrometer 312, 314 includes the associated temperature sensor (e.g., a resistance temperature detector (RTD)) 316, 318 to enable the spectrometers 312, 314 to be independently and/or accurately calibrated even when there is inhomogeneous downhole temperature distribution (e.g., the temperatures at the spectrometers 312, 314 are different).

In operation, the light source 302 emits light that travels through the reference signal path 304 and through the measurement signal path 306. The light travels directly to the reference spectrometer 312 and through windows (e.g., sapphire windows) 315 and/or fluid 317 contained in a flowline 319 to the measurement spectrometer 314. To calibrate the spectrometers 312, 314, measurements may be taken when the light source 302 is on (e.g., emitting light) and when the light source 302 is off (e.g., not emitting light). The measurements may include optical measurements obtained by the spectrometers 312, 314 and/or temperature measurements obtained by the temperature sensors 316, 318. The state and/or on/off sequence of the light source 302 may be controlled by a processor 320 and the measurements obtained by the spectrometers 312, 314 and/or the temperature sensors 316, 318 may be stored in a database 322.

Because of the downhole environment (e.g., high temperatures) in which the measurements are obtained, error may be introduced into the measurements (e.g., baseline drift). In some examples, a temperature coefficient (TC) is determined to compensate for this baseline drift. The temperature coefficient may be expressed as a function of temperature. In some examples, the temperature coefficient is determined uphole by measuring a dry flowline log measure source ratio (LMSR) at discrete and/or different temperature points. The temperature points may include 25° C., 50° C., 75° C., 100° C., 125° C., 150° C. and 175° C. (e.g., $T_i$ (i=0-6)). In some examples, temperature calibrations and/or coefficients may be determined using linear interpolation. The log measure source ratio may be determined using Equation 1 and the temperature coefficient may be determined using Equation 2.

$$LMSR_i = -\log_{10} \frac{V_{MEASON,i} - V_{MEASOFF,i}}{V_{REFON,i} - V_{REFOFF,i}} \quad \text{Equation 1}$$

$$TC_i = LMSR_i - LMSR_o \quad \text{Equation 2}$$

If both spectrometers (e.g., the reference spectrometer and the measure spectrometer) 312, 314 are at substantially the same temperature, as measured by the temperature sensors 316, 318, then the temperature coefficient in the intermediate temperature region, TC(T) is given by linearly interpolating, $TC_i$, as represented by Equation 3.

$$TC(T) = \frac{TC_{i+1} - TC_i}{T_{i+1} - T_i}(T - T_i) + TC_i \quad \text{Equation 3}$$

However, Equation 3 may not be used when the temperature at both spectrometers 312, 314 are not the same (e.g., temperature is inhomogenous), as measured by the temperature sensors 316, 318. To enable the spectrometers 312, 314 to be accurately and/or independently calibrated when the temperature at the spectrometers 312, 314 is different and/or inhomogenous, each spectrometer 312, 314 has the associated temperature sensor 316, 318 adjacent thereto. Equations 4-7 may be used to determine the temperature coefficient. Referring to Equation 4, $V_{MEASON,i}$ corresponds to the voltage measurement from the measurement spectrometer 314 when the light source 302 is on at a temperature point (e.g., 25° C., 50° C., 75° C., 100° C., 125° C., 150° C. and 175° C.), $V_{MEASOFF,i}$ corresponds to the voltage measurement from the measurement spectrometer 314 when the light source 302 is off at the temperature point, $V_{MEASON,0}$ corresponds to the voltage measurement from the measurement spectrometer 314 when the light source 302 is on at a reference temperature point (e.g., room temperature, 25° C.) and $V_{MEASOFF,0}$ corresponds to the voltage measurement from the measurement spectrometer 314 when the light source 302 is off at the reference temperature point. Referring to Equation 6, $V_{REFON,i}$ corresponds to the voltage measurement from the reference spectrometer 312 when the light source 302 is on at a temperature point (e.g., 25° C., 50° C., 75° C., 100° C., 125° C., 150° C. and 175° C.), $V_{REFOFF,i}$ corresponds to the voltage measurement from the reference spectrometer 312 when the light source 302 is off at the temperature point, $V_{REFON,0}$ corresponds to the voltage measurement from the reference spectrometer 312 when the light source 302 is on at a reference temperature point (e.g., room temperature, 25° C.) and $V_{REFOFF,0}$ corresponds to the voltage measurement from the reference spectrometer 312 when the light source 302 is off at the reference temperature point.

$$V'_{MEAS,i} = (V_{MEASON,i} - V_{MEASOFF,i}) - (V_{MEASON,0} - V_{MEASOFF,0}) \qquad \text{Equation 4}$$

$$V'_{MEAS}(T_{MEAS}) = \frac{V'_{MEAS,i+1} - V'_{MEAS,i}}{T_{i+1} - T_i}(T_{MEAS} - T_i) + V'_{MEAS,i} \qquad \text{Equation 5}$$

$$V'_{REF,i} = (V_{REFON,i} - V_{REFOFF,i}) - (V_{REFON,0} - V_{REFOFF,0}) \qquad \text{Equation 6}$$

$$V'_{REF}(T_{REF}) = \frac{V'_{REF,i+1} - V'_{REF,i}}{T_{i+1} - T_i}(T_{REF} - T_i) + V'_{REF,i} \qquad \text{Equation 7}$$

$$TC(T_{MEAS}, T_{REF}) = -\log_{10}\frac{V'_{MEAS}(T_{MEAS})}{V'_{REF}(T_{REF})} \qquad \text{Equation 8}$$

Figure 4:
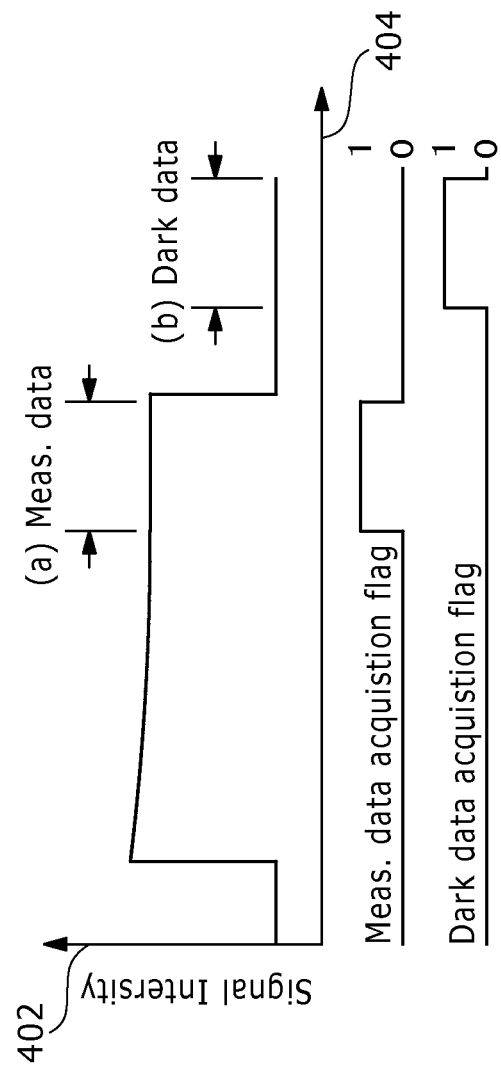
FIG. 4 is a graph depicting results of the examples disclosed herein.

FIG. 4 depicts a graph including results obtained using the examples disclosed herein, where a y-axis 402 corresponds to the signal intensity measured at one of the spectrometers 312, 314, and the x-axis 404 corresponds to time.

Figure 5:
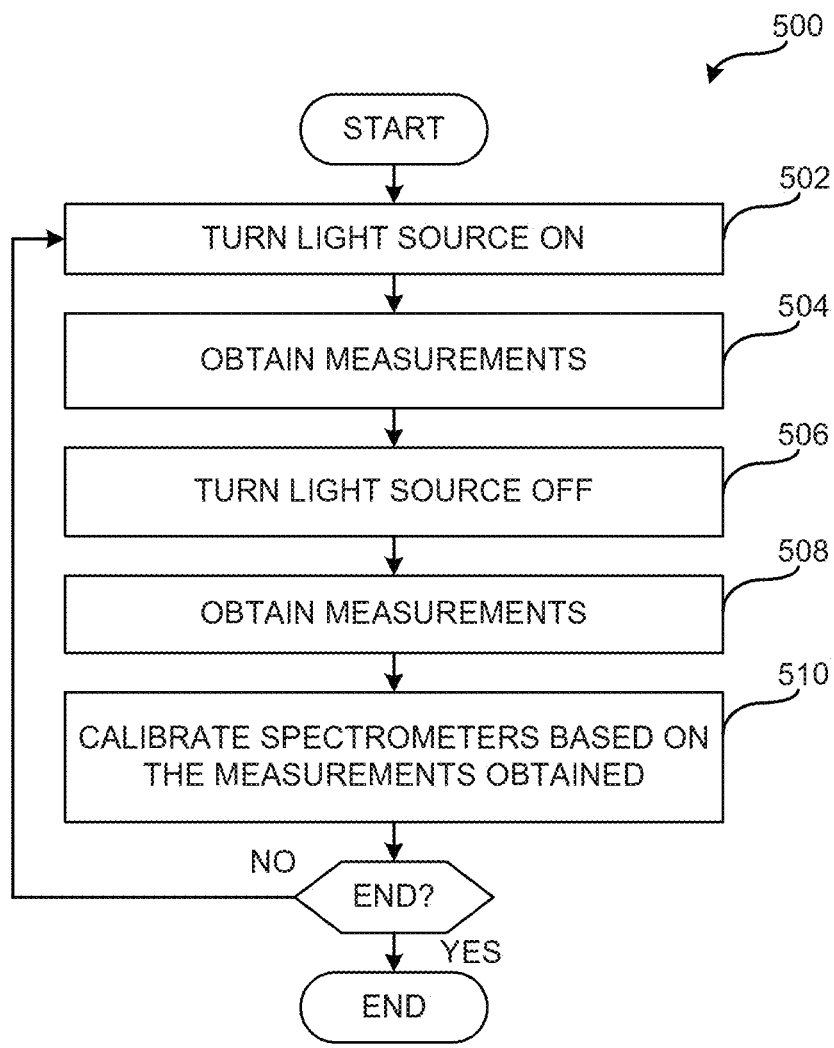
FIG. 5 depicts an example process that can be implemented using the example apparatus for downhole fluid analysis.

FIG. 5 depicts an example flow diagram representative of processes that may be implemented using, for example, computer readable and executable instructions that may be used to calibrate and/or analyze fluid using a fluid analysis apparatus. The example processes of FIG. 5 may be performed using a processor, a controller and/or any other suitable processing device. For example, the example processes of FIG. 5 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 5 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 5 may be implemented manually or as any combination(s) of any of the foregoing techniques, for example, any combination of firmware, software, discrete logic and/or hardware. Further, although the example processes of FIG. 5 are described with reference to the flow diagram of FIG. 5, other methods of implementing the processes of FIG. 5 may be employed. For example, the order of execution of the blocks may be changed, and/or some of the blocks described may be changed, eliminated, sub-divided, or combined. Additionally, any or all of the example processes of FIG. 5 may be performed sequentially and/or in parallel by, for example, separate processing threads, processors, devices, discrete logic, circuits, etc.

The example process 500 of FIG. 5 may begin by turning a light source on and/or having the light source in a first state (block 502) and obtaining one or more measurements (block 504). For example, a first spectrometer and/or temperature sensor may obtain first measurements and a second spectrometer and/or temperature sensor may obtain second measurements. The first spectrometer may receive light directly from the light source and the second spectrometer may receive light transmitted through a downhole fluid sample and/or a flowline.

The light source may be turned off and/or be in a second state (block 506) and one or measurements may be obtained (block 508). For example, the first spectrometer and/or temperature sensor may obtain third measurements and the second spectrometer and/or temperature sensor may obtain fourth measurements. The example process 500 may then determine a temperature coefficient based on the measurements that can be used to calibrate the second spectrometer and/or measurements received therefrom (block 510). In some examples, the temperature coefficient may be applied to measurements obtained by the second spectrometer to compensate for baseline drift.

Figure 6:
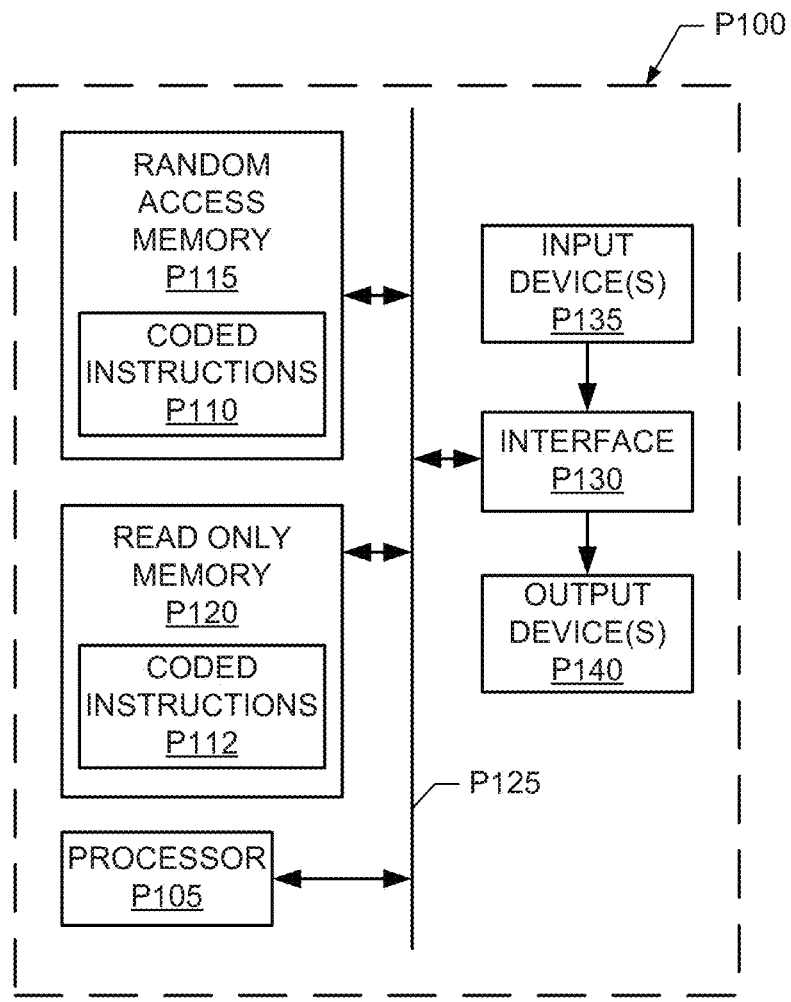
FIG. 6 is a schematic illustration of an example processor platform that may be used and/or programmed to implement any or all of the example methods are apparatus disclosed herein.

FIG. 6 is a schematic diagram of an example processor platform P100 that may be used and/or programmed to implement to implement a logging and control computer (FIG. 6), the processor 320 and/or any of the examples described herein. For example, the processor platform P100 can be implemented by one or more general purpose processors, processor cores, microcontrollers, etc.

The processor platform P100 of the example of FIG. 6 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

As disclosed herein, an example method includes obtaining first measurements from a first spectrometer and a second spectrometer when a light source is on obtaining second measurements from the first spectrometer and the second spectrometer when the light source is off calibrating the first spectrometer based on the first measurements and the second measurements. In some examples, the first measurements include optical measurements and temperature measurements and the second measurements include optical measurements and temperature measurements. In some examples, calibrating the first spectrometer includes determining a temperature coefficient. In some examples, the method also includes obtaining a third measurement from the first spectrometer. In some examples, the method also includes applying the temperature coefficient to the third measurement to compensate for drift in the third measurement. In some examples, the temperature coefficient is applied to the third measurement in real-time. In some examples, one or more of the measurements obtained by the first spectrometer are obtained through a fluid sample. In some examples, the fluid sample includes a downhole fluid sample.

An example method includes obtaining a first measurement of a fluid sample downhole using a first spectrometer and applying a temperature coefficient to the first measurement to compensate for drift in the first measurement. The temperature coefficient is determined based on second measurements obtained when a light source is in a first state and when the light source is in a second state. In some examples, in the first state, the light source is on and, in the second state, the light source is off. In some examples, the second measurements include optical and temperature measurements obtained at the first spectrometer and optical and temperature measurements obtained at a second spectrometer. In some examples, the first spectrometer includes a measurement spectrometer and the second spectrometer comprises a reference spectrometer.

An example apparatus includes a first fluid analysis apparatus, a second fluid analysis apparatus, a light source and a processor to determine a temperature coefficient value based on measurements received from the first and second fluid analysis apparatus. The measurements received when the light source is on and when the light source is off. In some examples, the measurements include a first measurement, a second measurement, a third measurement, and a fourth measurement. The first fluid analysis apparatus is to obtain the first measurement when the light source is on and the second measurement when the light source is off. The second fluid analysis apparatus is to obtain the third measurement when the light source is on and the fourth measurement when the light source is off. In some examples, the apparatus includes a first sensor at the first fluid analysis apparatus and a second sensor at the second fluid analysis apparatus.

The first sensor is to measure a first temperature value and the second sensor is to measure a second temperature value. In some examples, the processor is to determine the temperature coefficient based on the first temperature value and the second temperature value. In some examples, the processor is to apply the temperature coefficient to a second measurement obtained by the second fluid analysis apparatus to compensate for drift in the second measurement. In some examples, the first fluid analysis apparatus includes a reference spectrometer and the second fluid analysis apparatus includes a measurement spectrometer. In some examples, the temperature coefficient is determined based on a log measure source ratio value at different temperatures. In some examples, the temperature coefficient value is determined based on a temperature at the first fluid analysis apparatus being a first value and a temperature at the second fluid analysis apparatus being a second value. The first value is different than the second value.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:
obtaining first measurements from a first spectrometer and a second spectrometer when a light source is on;
obtaining second measurements from the first spectrometer and the second spectrometer when the light source is off; and
calibrating the first spectrometer based on the first measurements and the second measurements.

2. The method of claim 1, wherein the first measurements comprise optical measurements and temperature measurements and the second measurements comprise optical measurements and temperature measurements.

3. The method of claim 1, wherein calibrating the first spectrometer comprises determining a temperature coefficient.

4. The method of claim 3, further comprising obtaining a third measurement from the first spectrometer.

5. The method of claim 4, further comprising applying the temperature coefficient to the third measurement to compensate for drift in the third measurement.

6. The method of claim 5, wherein the temperature coefficient is applied to the third measurement in real-time.

7. The method of claim 1, wherein one or more of the measurements obtained by the first spectrometer are obtained through a fluid sample.

8. The method of claim 7, wherein the fluid sample comprises a downhole fluid sample.

9. An apparatus, comprising:
- a first fluid analysis apparatus comprising a reference spectrometer;
- a second fluid analysis apparatus comprising a measurement spectrometer;
- a light source; and
- a processor to determine a temperature coefficient value for calibration of the measurement spectrometer based on measurements obtained from the first and second fluid analysis apparatus, the measurements obtained when the light source is on and when the light source is off.

10. The apparatus of claim 9, wherein the measurements comprise a first measurement, a second measurement, a third measurement, and a fourth measurement, the first fluid analysis apparatus to obtain the first measurement when the light source is on and the second measurement when the light source is off, the second fluid analysis apparatus to obtain the third measurement when the light source is on and the fourth measurement when the light source is off.

11. The apparatus of claim 10, further comprising a first sensor at the first fluid analysis apparatus and a second sensor at the second fluid analysis apparatus, the first sensor to measure a first temperature value and the second sensor to measure a second temperature value.

12. The apparatus of claim 11, wherein the processor is to determine the temperature coefficient based on the first temperature value and the second temperature value.

13. The apparatus of claim 9, wherein the processor is to apply the temperature coefficient to a second measurement obtained by the second fluid analysis apparatus to compensate for drift in the second measurement.

14. The apparatus of claim 9, wherein the temperature coefficient is determined based on a log measure source ratio value at different temperatures.

15. The apparatus of claim 9, wherein the temperature coefficient value is determined based on a temperature at the first fluid analysis apparatus being a first value and a temperature at the second fluid analysis apparatus being a second value, the first value being different than the second value.

16. An apparatus, comprising:
- a first fluid analysis device for obtaining first measurements from a first spectrometer and a second spectrometer when a light source is on;
- a second fluid analysis device for obtaining second measurements from the first spectrometer and the second spectrometer when the light source is off; and
- a processor configured to calibrate the first spectrometer based on the first measurements and the second measurements.

* * * * *